United States Patent [19]
Ekman

[11] 3,795,486
[45] Mar. 5, 1974

[54] WET SCRUBBER
[75] Inventor: Frank O. Ekman, Barrington, Ill.
[73] Assignee: Environeering Inc., Skokie, Ill.
[22] Filed: Feb. 22, 1973
[21] Appl. No.: 334,739

[52] U.S. Cl. ................... 23/283, 23/284, 55/22, 55/73, 55/91, 55/223, 55/228, 55/229, 55/231, 55/240, 55/242, 55/257, 241/DIG. 2, 261/111, 261/112, 261/115, 423/242
[51] Int. Cl. ................ B01d 47/06, B01d 47/12
[58] Field of Search 423/242, 244, 215.5, 511, 544, 423/554, 555, 551, 545; 55/73, 220, 229, 223, 228, 230, 231, 233, 240, 241, 242, 257, 440, 22, 84, 85, 89, 90, 91, 93, 94; 261/81, 83, 89, 90, 108, 109, 110, 111, 112, 113, 114 R, 114 VT, 115; 241/DIG. 2; 23/283, 284

[56] References Cited
UNITED STATES PATENTS

| | | | |
|---|---|---|---|
| 2,316,491 | 4/1943 | Teichner | 261/112 |
| 2,523,441 | 9/1950 | McKamy | 55/223 |
| 2,895,566 | 7/1959 | Coulter | 55/257 X |
| 3,022,054 | 2/1962 | Kotzebue | 261/114 VT |
| 3,353,799 | 11/1967 | Lions et al. | 261/3 |
| 3,488,039 | 1/1970 | Ekman | 261/81 |
| 3,544,087 | 12/1970 | McIlvaine | 55/233 X |
| 3,687,613 | 8/1972 | Rickard | 423/242 |

FOREIGN PATENTS OR APPLICATIONS

| | | | |
|---|---|---|---|
| 885,548 | 5/1943 | France | 261/114 VT |

OTHER PUBLICATIONS
"New SO₂ Removal Systems," Filtration & Separation, Vol. 9, No. 4, July/August 1972, page 484.

Primary Examiner—Dennis E. Talbert

[57] ABSTRACT

A wet scrubber for absorbing oxides of sulphur from contaminated gas comprises an upright housing having an inlet for contaminated gas adjacent at the lower end and an outlet for clean gas adjacent the upper end, a plurality of vertically stacked, successive intense wet scrubbing zones in said housing between said inlet and outlet, each of said zones comprising a horizontal array of elongated, parallel, spaced apart rod like elements which substantially reduce the total flow cross section available to the gas moving therebetween to a value less that of the cross section above and below the array, upper spray means adjacent an upper of said scrubbing zones for distributing into said gas finely divided droplets of scrubbing liquor, which liquor comprises a limestone slurry, said liquor flowing in a downward direction and cascading countercurrent to the upward gas flow through each successively lower scrubbing zones, a high velocity particulate collector stage in said housing between said inlet and a lower of said wet scrubbing zones comprises baffle means across said housing having a flow restricting opening therein and lower spray means for directing scrubbing liquid into the high velocity gas flowing through said opening in a concurrent direction therewith.

7 Claims, 7 Drawing Figures

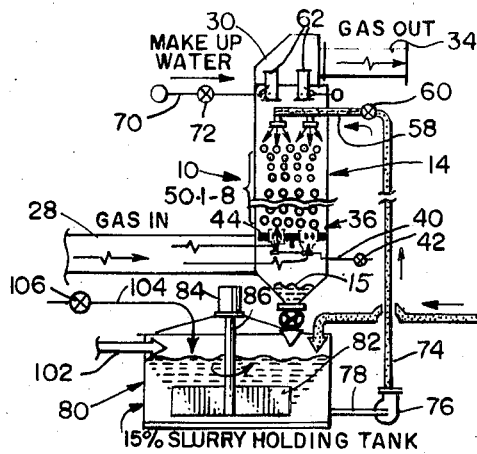

WET SCRUBBER

The present invention is directed towards a new and improved wet scrubber system for contaminated gas and more particularly is directed towards a wet scrubber comprising a combination particulate removal section and a gas absorption section for collecting and removing oxides of sulphur and other objectionable gaseous constituents contained in the industrial gases being treated.

The scrubber of the present invention is an improvement over the apparatus shown and described in U.S. Pat. No. 3,488,039 and provides a highly efficient means for removing both particulate matter and objectionable gaseous contaminants such as oxides of sulphur in a single wet scrubbing unit.

In some prior art scrubbing systems designed for absorbing oxides of sulphur, a scrubbing liquid comprising a limestone slurry is intimately contacted with the contaminated gas as the gas moves upwardly in an absorber tower while the scrubbing liquid flows downwardly over loose ceramic packing material. These types of apparatus for absorbing sulphur oxides in gas are unsatisfactory because of the fact that the tower elements or packing material quickly plugs up with calcium sulphate and other scale forming materials. Cleaning of the elements and packing material at frequent intervals is costly and time consuming. As the scale collects on the packing material the pressure drop becomes excessive and the amount of power required per unit volume of gas being treated is so high that the scrubbers are unable to operate on an economical basis. In addition, it is uneconomical to clean the packing material and complete replacement of the elements is often necessary.

It is therefore an object of the present invention to provide a new and improved wet scrubber system capable of removing oxides of sulphur from industrial gases and the like in an efficient and economic manner.

Another object of the invention is to provide a new and improved wet scrubber which is highly efficient in the removal of particulate contaminants as well as gaseous contaminants such as oxides of sulphur from industrial gases and the like.

Still another object of the invention is to provide a new and improved wet scrubber of the character described which is highly efficient in removal of contaminant particles and gaseous contaminants from industrial gases which is operable at extremely high efficiency in terms of power requirements per unit of gas being treated and in terms of quantity flow rate of liquid required per unit of gas being treated.

Another object of the present invention is to provide a new and improved wet scrubber of the character described which is highly resistant to plugging or clogging up even though limestone slurry is used as a scrubbing liquor.

Another object of the present invention is to provide a new and improved scrubber of the character described employing plurality of vertically stacked, wet scrubbing stages spaced apart sufficiently to provide successive gas absorption zones of high velocity gas flow alternated with deceleration zones of low velocity wherein little wear or abrasive action on the scrubber occurs and wherein little if any tendency towards plugging of the system with scale or deposits of precipatates occurs.

Another object of the present invention is to provide a new and improved wet scrubber of the character described wherein scrubbing liquor is cascaded downwardly through a series of successive scrubbing zones or stages employing a plurality of rod elements in horizontal arrays for providing impingement surfaces for disbursing and deflecting the downwardly cascading scrubbing liquid moving toward the lower end of the scrubber counter to the direction of upward gas flow.

Another object of the present invention is to provide a new and improved wet scrubber of the character described which lends itself to rapid cleaning and easy and rapid replacement of the rod-like elements in each of the several successive scrubbing zones.

Another object of the present invention is to provide a new and improved wet scrubber of the character described which scrubber is capable of removing large quantities of oxides of sulphur with a relatively low pressure drop through the scrubber being required.

Another object of the invention is to provide a new and improved wet scrubber of the character described which scrubber is well able to withstand high temperature gases and which scrubber is not highly sensitive in terms of performance to increased heat and temperatures of the gas being treated.

These and other objects and advantages of the present invention are accomplished in an illustrated embodiment comprising a wet scrubber for absorbing oxides of sulphur and particulates from contaminated industrial gases and the like including an upright housing having an inlet for contaminated gas adjacent to the lower end and an outlet for clean gas adjacent the upper end. A plurality of vertically stacked, intense wet scrubbing stages or zones is provided in the housing between the inlet and outlet and each zone or stage includes a horizontal array of elongated, parallel spaced apart rod-like elements, which elements substantially reduce the total cross sectional flow area in the housing at the level of the array. Upper spray means adjacent an upper of said scrubbing zones is provided for distributing finely divided droplets of scrubbing liquor into the gas flow. The liquor may comprise water and/or a mixture of water and limestone in a slurry which cascades downwardly onto the elements in each successive lower scrubbing zone while the gas on the other hand flows upwardly in a counter direction through the scrubber housing.

Adjacent the lower end of the housing there is provided a high velocity, particulate collector stage comprising a baffle across the housing having a flow restricting orifice or opening of reduced cross-section and lower spray means is provided for directing scrubbing liquid into the high velocity gas flow as it passes into and through the opening in a concurrent direction therewith.

With a scrubbing liquor comprising a wet limestone slurry a reaction is obtained with the oxides of sulphur in the gas forming calcium sulphite and/or calcium sulphates and this material is precipitated out of the gas flow and eventually moves to the lower end of the housing in a collection sump below the gas inlet. The concentrated material thus removed leaves the gas in a clean condition substantially free of sulphur dioxide and particulates and the gas passes out via the outlet at the upper end of the housing.

For a better understanding of the invention reference should be had to the following detailed description taken in conjunction with the drawings in which:

FIG. 2 is a schematic diagram illustrating the scrubber of FIG. 1 in conjunction with a slurry system for providing scrubbing liquor of wet limestone slurry for the scrubber; and FIGS. 3-7 are graphical representations illustrating operating characteristics of the wet scrubber system of the invention when operating at various different parameters and variables.

Figure 1:
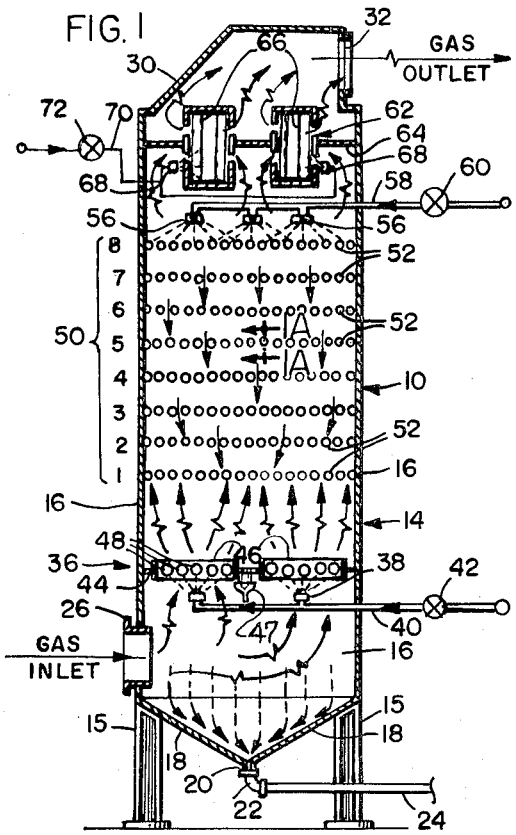
FIG. 1 is a vertical cross sectional view of a new and improved wet scrubber system constructed in accordance with the features of the present invention.

Referring now more particularly to the drawings, in FIGS. 1 and 2 is illustrated a new and improved wet scrubber constructed in accordance with the features of the present invention and referred to generally by the reference numeral 10. The wet scrubber 10 is especially well adapted for treating industrial gases and the like which contain objectionable amounts of oxides of sulphur as well as objectionable particulate material such as flyash and the like. The scrubber is designed for use in conjunction with a system 12 which furnishes to the scrubber a supply of scrubbing liquor comprising a wet limestone slurry of crushed limestone rock and water. Other types of scrubbing liquors may be used in the scrubber as discussed hereinafter.

The scrubber includes an upstanding housing 14 preferably of rectangular or square cross section and including vertical side walls 16, preferably of sheet metal having suitable strength and characteristics for resisting corrosion. At the lower end, the housing 14 is provided with a sump 15 having inwardly and downwardly sloping bottom walls 18 which converge at a lower drain outlet 20 for discharging the collected contaminated scrubbing liquid back into the slurry system 12 via the suitable drain fittings such as an elbow 22 and drain line 24. The sump 15 in the lower end of the housing 14 is used to collect the scrubbing liquid along with the contaminants absorbed therein obtained from the gas being cleaned in the scrubber housing.

The contaminated gas to be treated is introduced into the lower end of the housing 14 via an inlet fitting 26 supplied by a duct 28 connected to the source of contaminated gas (FIG. 2). Clean gas is discharged from the upper end of the housing 14 from a collecting bonnet 30 having an outlet 32 connected to a suitable discharge duct 34 (FIG. 2). A fan or blower (not shown) is provided for moving the gas through the scrubber housing and duct system at the desired flow velocity and pressure. The blower or fan may be located on the outlet or discharge side of the systems or on the inlet side of the system as required for a particular installation. The gases entering the lower end of the housing through the inlet 26 are turned upwardly and flow is a generally vertical path toward the discharge bonnet 30 at the upper end of the housing and some of the heavier and larger contaminant particles therein gravitate out of the gas flow and collect in the sump 15 because of inertial forces as the gases turn to flow in an upward direction.

In accordance with the present invention, the scrubber 10 includes a particulate removal stage referred to generally by the reference numeral 36 and positioned above the gas inlet 26. Scrubbing liquid such as water is sprayed into the gas flow and is directed concurrently with the upward gas flow in the particulate stage 36 by means of a plurality of lower spray nozzles 38, which nozzles are supplied from a manifold 40. The nozzles are positioned in the housing to spray finely divided droplets of liquid generally upwardly in a direction concurrent with the upwardly flowing gas. The amount and flow rate of the scrubbing liquid supplied to the manifold 40 is controlled and adjustable to the desired level by means of a control valve 42.

The particulate removal stage 36 includes a horizontal wall or baffle structure 44 extending transversely across the housing between opposite side walls 16 and dividing the housing into an upper and a lower chamber. The structure 44 is formed with one or more rectangular openings therein each of which is preferably positioned above a nozzle 38. Within each opening there is provided a modular nozzle structure 46 including a rectangular frame and a plurality of elongated grids or rods 48 extending between one pair of opposite side members of the frame and arranged in a spaced apart parallel array across the flow passage defined within the frame. The modular structures 46 are preferably similar to that shown and described in the aforementioned U. S. Pat. No. 3,488,039. The rods 48 are mounted for free rotation about their longitudinal axis and are rotatably supported at opposite ends from the side frame members. The spray of water directed upwardly by the nozzles 38 impinges on the surfaces of the rods to wet the same and provides a liquid film for collecting the particulates and other wettable contaminants in the gas as the gas flows turbulently upwardly through the openings or slots defined between the rods 48 and frame members. The effective total cross sectional gas flow area defined between rods and frame members is determined by the frame size, rod size and spacing and the number of modules 46 provided on the baffle structure 44. The gas flow through the slots between rods is turbulent and at a high velocity because the flow area is smaller than the overall cross sectional flow area of the scrubber housing 16. The velocity of the gas flow is greatly accelerated as the gas moves through the slots between the pairs of adjacent rods 48 and turbulent flow causes the particulate matter in the gas to become wetted as the gas contacts the liquid film on the surface of the rods and droplets carried in the gas flow. The contaminant material in the gas impinges and collects in the liquid forming liquid droplets and these liquid droplets move downwardly and collect in the sump 15.

After the gas passes between the rods 48 of the first or lower particulate removal, wet scrubbing stage 36 adjacent the lower end of the scrubber housing it moves upwardly towards the outlet plenum or bonnet 30 at a substantially reduced average velocity, which velocity is dependent upon the pressure and density of the gas and the whole cross sectional flow area of the housing. Above the particulate separation stage 36, the gas passes through a series of vertically stacked, wet scrubbing stages referred to by the reference numerals 50-1, 2, 3, 4, 5, 6, 7, 8 etc. Each of these scrubbing stages includes a plurality of spaced apart, parallel, elongated rods or tubes 52 arranged in a horizontal array and extending between opposite side walls 16 transversely across the scrubber housing. The vertical spacing distance between the successive stages of rods is set up to provide a great degree of independence between the scrubbing action accomplished at each different level or zone. For example, scrubbing liquid cascading downwardly from the upper end of the scrubber housing 14 strikes the rods 52 in each of the layers in descending order and is deflected upwardly and outwardly from the rods for a brief interval. During this brief interval the liquid droplets are buoyed upwardly by the force of the high velocity turbulent gas flow. The scrubbing liquid droplets grow larger as contaminants are collected and precipitates form therein and eventually the droplets gravitate downwardly to the next lower, relatively independent, scrubbing zone or stage whereat similar action takes place in the immediate level or vicinity of the array or layer of parallel rods 52 of the zone.

In describing the visual appearance of the scrubbing action in the scrubber 10 as the scrubbing liquor cascades downwardly to each subsequently lower array of rods 52 in the next successive lower scrubbing stage 50-1, 2, 3, 4, 5, 6, 7, 8, it appears that the scrubbing liquor is somewhat like a waterfall. After reaching the upper scrubbing stages 50-8 and 50-7 etc., the contaminated gas has been substantially cleansed and has a lower level of contaminant concentration therein. Because of this, it is more difficult to absorb the remaining contaminants so that in these stages the incoming fresh scrubbing liquor is most effective. As the liquor cascades downwardly from stage to stage, more and more contaminants are absorbed therein until the lower scrubbing stages 50-1 and 50-2 are reached. The liquor collects on the baffle structure or divider wall 44 and is drained to the sump intermittently through one or more sock-type drain valves 47. The valves 47 include a normally closed rubber sock at the lower end of a drain tube and when the liquid head above the sock reaches a high enough level the sock is opened to discharge the liquid and then closes again after the discharge is completed.

The gas flows upwardly in a connection generally countercurrent to the downwardly cascading liquid flow moving from the upper scrubbing stage 50-1 to the lower stage 50-8 and as the gas reaches each successive higher scrubbing stage the flow is momentarily accelerated as it flows between the rods 52 which decrease the effective flow area cross-section and thereby increases the flow velocity. The highly turbulent, high velocity gas flow adjacent the level of the rods in each stage provides an upward buoyant fountain effect which tends to hold and retain the downward travel of the liquid droplets momentarily in the area or zone just above and between the rods. This fountain effect at each zone permits a longer time for intermixing and intensive contact between the liquid and gas at each level. The buoyant fountain effect momentarily causes the liquid to reverse its downward flow directions in the vicinity or level of the rods at each stage and the liquid moves upwardly for a brief period in a direction concurrent with the upwardly flowing gas. As the size of the liquid droplets and the density thereof becomes high enough to overcome the buoyant effect of the high velocity gas the droplets then begin to fall back downwardly. This fountain effect just described permits the smaller, less denser liquid droplets to remain in the gas stream for a longer period of time until full collection efficiency is obtained before the droplets grow larger and heavy enough to cascade back downwardly to the next lower stage. As the droplets reach the next lower stage some droplets strike the rods and the impact breaks the droplets up into smaller size droplets which remain in the vicinity until they grow in size and weight enough to overcome the buoyant fountain effect and fall to the next lower stages.

The number of successive vertically spaced scrubbing stages or zones may be selectively adjusted for a particular application and the amount of vertical spacing between stages and the open spacing or distance between the rods in each layer as well as the diameter of the rods may be selected to provide a desired particular gas velocity and water rate for a particular application. The rods are mounted for free rotary movement about their longitudinal axes and the surfaces of the rods may continuously rotate so that the heavier accumulation of precipitate material tend to face downwardly toward the upwardly flowing gas. Thus, each stage is self-cleaning and little or no plugging up or clogging over of the spaces between the rods occurs even though materials such as calcium sulphates and sulphites which tend to precipitate or plate out rather easily are present.

It has been found that the direction of gas flow relative to water flow has little effect on the efficiency of the collection of particulates from the gas and the direction of water spray in the particulate collection stage 36 may be either upward or downward. In the $SO_2$ absorption process in the upper chamber of the housing 16, whether the gas flow is up or down relative to the general downward direction of liquid flow does have a considerable effect on the efficiency of absorption. For an example in a scrubber having a given rod configuration and vertical spacing between stages and at a given gas flow rate and water rate, the absorption efficiency for an upward direction of gas flow is around 35 percent of $SO_2$ removed in contrast to a 20 percent $SO_2$ removal when the direction of the gas flow is reversed to a downward direction.

The difference in $SO_2$ absorption efficiencies between upward and downward gas flow is believed to be due to the "fountain effect" wherein the scrubbing liquor striking a layer of rods in a stage momentarily gushes upwardly at this level helped by the influence of the upward gas flow and then cascades back downwardly toward the drainage deck 44 while the water droplets contact the gas a second time. This arrangement is in contrast to a constant downward flow where the droplets are merely dispersed by the rods and after a brief period of contact with the gas, the liquid reaches the sump. For a given distance of scrubber height an upward gas flow arrangement provides for greater contact time between the liquid and gas due the fountain effect occurring at each rod stage wherein the gas is contacted by the droplets as the droplets momentarily move upwardly before again falling back downwardly. To provide the same amount of gas-liquid contact time with both the gas and the liquid flowing in the same direction a much great scrubber height is required with a resulting higher cost. The present scrubber 10 thus provides a most efficient manner of removing the particulates and the $SO_2$ in industrial gases by providing a first lower or initial particulate removal stage 36 wherein the upward gas flow has relatively little effect on particulate removal efficiency followed by a second $SO_2$ absorbing section comprising a plurality of vertically spaced rod stages 50-1, 2, etc. wherein an upward gas flow is extremely efficient in terms of $SO_2$ absorption and most advantageous in comparison to a downward gas flow arrangement.

Another benefit of the lower rod modules 46 of the particulate stage 36 is that the modules act to distribute the gas flow more uniformly over the entire cross-section of the housing upwardly thereof. The phenomenon of nonuniform gas distribution over the flow cross-section of a vessel is especially prevalent at relatively low free space gas velocities and efforts to promote a more uniform gas velocity distribution have in the prior art been relegated to devices such as screens which offer a substantial flow resistance. Screens are generally difficult to use with scrubbing liquids such as limestone slurries because of a tendency to plug-up rapidly with resulting operational difficulties. The rod modules 46 on the baffle 44 have acted to more evenly distribute the gas velocity over the entire cross section of the housing with a considerably lower pressure drop than a screen and with little or no problem of plugging up.

The rods 52 in each stage 50-1 through 50-8 provide additional mechanical strength between opposite sidewalls 16 of the scrubber housing 14 and the rods are readily removable for replacement and cleaning when desired. One or both of the side walls 16 of the scrubber housing 14 parallel with the rods 52 is provided with an access opening normally sealed by a removable access door (not shown) so that a workman may have access to the interior of the scrubber housing for removing and replacement on the rods as required. Referring to FIG. 1A, each rod 52 is supported for free rotation at opposite ends by means of a pair of removable pins or axles 54 having enlarged heads at their outer ends. The pins are threadedly received in openings provided in the walls 16 of the housing.

In accordance with the present invention, a scrubbing liquor comprising a mixture of water and crushed limestone rock in a wet slurry is intermixed with the gas and is introduced into the upper end of the scrubber housing 14 adjacent the level of the upper scrubbing stage 50-8. The slurry is directed downwardly toward the rods 52 of the upper scrubber stage through a plurality of ceramic body, spray nozzles 56 spaced apart at appropriate intervals above the rods of the upper scrubbing stage 50-8. The spray nozzles 56 are supplied with fresh limestone slurry or a combination of recycled slurry with fresh limestone slurry added as makeup through a piping manifold 58 and a flow control valve 60 is provided to regulate the desired flow rate of fresh scrubbing liquid into the system. The liquid-to-gas ratio used in the scrubber 10 may be adjusted as desired by regulating the valve 60. The slurry system is designed to provide for a wide range of liquid-to-gas ratios varying from approximately 5 to 60 gallons of liquid slurry per thousand cubic feet per minute of gas flow. The L/G ratio used is dependent upon the type of gas being treated and the quantity and type of contaminants carried therein, as well as the amount of contaminants that need to be removed in the process to meet the particular requirements of the installation as set up by applicable pollution control standards and codes. The liquid-to-gas ratio or L/G ratio is also known as the "Water Rate" for a scrubber and is readily adjustable by opening or closing the control valve 60. The average gas velocity or flow rate of the gas through the scrubber is measured by a Pitot tube or other suitable instrument and depends upon the gas input to the scrubber housing. The average flow velocity of the gas is measured in terms of "inches of water" pressure loss through the scrubber housing from inlet to outlet and may be varied by changing the speed or horsepower applied to the fan or blower used for moving the gas through the system. As previously indicated, the number of scrubbing stages 50-1, 2 etc. may be changed as required and the vertical spacing between successive stages may also be adjusted as required. The diameter and number of rods 52 in each scrubbing stage for a housing of given cross section effects spacing or area between adjacent rods in each array or layer and this accordingly effects the gas velocity and pressure loss.

In FIGS. 3 through 7, test characteristics of the scrubber 10 are presented. In the graphs of FIGS. 3, 4, 5 and 7 the ordinate represents percent of Sulphur Dioxide removed from the gas and the abscissa represents the pressure loss of the gas flowing through the scrubber 10. Test gases containing a known quantity of Sulphur Dioxide were used and the percent removal figures were calculated by measuring the difference in Sulphur Dioxide levels in the test gas between samples taken at the inlet 26 and at the outlet 32 of the scrubber housing.

Figure 3:
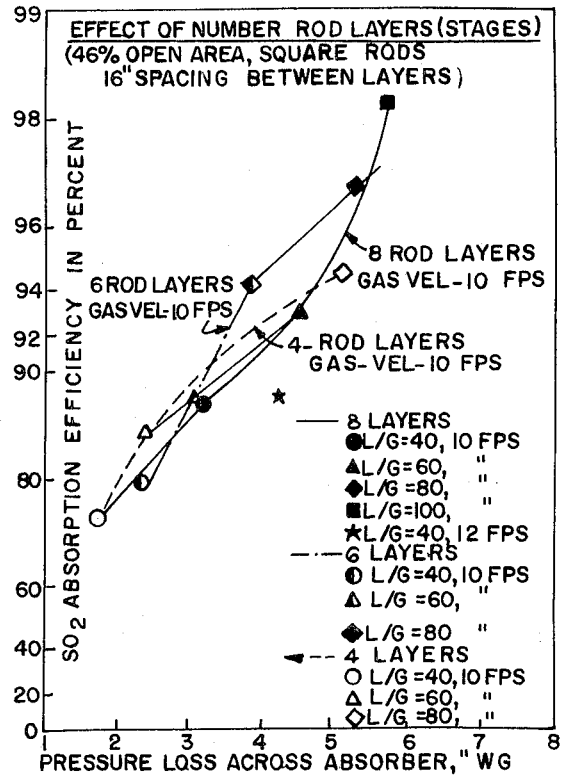

The graph of FIG. 3 indicates the effect of various different operating parameters on the absorption efficiency of the scrubber. In general, the data indicates that more scrubbing stages provide higher absorption efficiencies but require more horsepower or energy as indicated by the higher pressure losses. In each case, the rods 52 of each stage were spaced apart to provide an open area for gas flow in the spaces between the rods of a total of 46 percent of the gross transverse cross-sectional flow area of the housing. Tests were conducted with four stages, six stages and eight stages, with the rods in each stage identical and a vertical spacing between stages of 16 inches. The average gas velocity was held constant at 10 feet per second and for each scrubber configuration, the L/G ratio was varied as indicated from 40 gallons per 1,000 cubic feet per minute to as high as 100. In general, for a particular number of stages an increase in water rate resulted in an increase in absorption efficiency with a higher pressure loss resulting.

Figure 4:
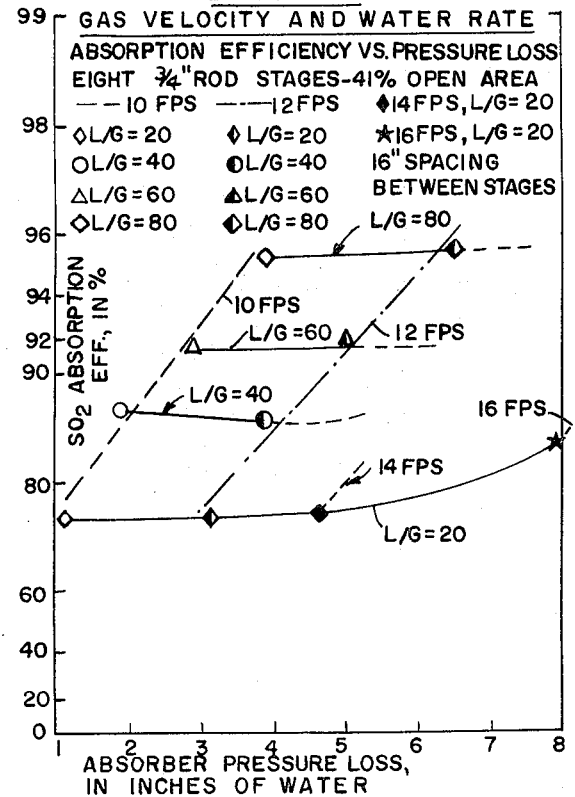

The graph of FIG. 4 illustrates more definitively the effect of varying the water rate and the gas velocity for a given number of scrubbing stages. In these tests, eight scrubbing stages were provided and each stage includes ¾ inch round pipes or rods spaced apart to provide a 41 percent open area. The stages were spaced at 16 inch intervals. The graph shows that higher gas velocity results in a substantially unchanged absorption efficiency if the L/G ratio is maintained constant and at a constant gas velocity an increase in water rate produces a substantial increase in absorption efficiency. This would indicate that water rate is far more important in achieving improved absorption than gas velocity.

Figure 5:
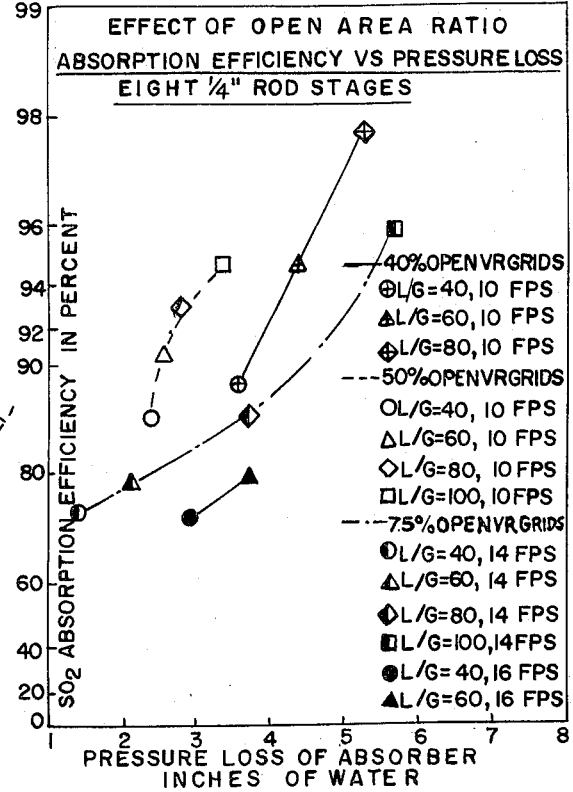

FIG. 5 illustrates the effect of rod configuration on absorption efficiency. For a given number of stages it appears that decreasing the open area and hence increasing the surface area of the rods while maintaining a relatively constant gas velocity improves the absorption efficiency. In this area the curves are rather steep indicating that more rod surface area available does increase absorption efficiency at a relatively lower cost in terms of pressure loss or power requirements than occurs when larger diameter rods are provided. This graph indicates that it might be better to provide a larger number of small diameter rods than to provide a smaller number of larger diameter rods by comparison with the results of FIG. 4 wherein larger diameter rods are used. The graph of FIG. 6 brings out this conclusion more clearly when comparing the results of the ¾ inch diameter rod stages "A" and the ¼ inch diameter rod stage "B" operated at the same water rates. In the graph of FIG. 6, the abscissa is in terms of horsepower per thousand cubic foot a minute gas flow and the formula for horsepower calculation is indicated. The curve designated "C" is drawn for a scrubber wherein a wire mesh grid of 46 percent open area is used for each stage rather than rods in one direction only. The curve designated "E" is drawn for a scrubber using two layers or stages of ceramic packing materials in spaced apart bed, each bed being 12 inches deep like that shown in U.S. Pat. No. 2,253,261, and the curve "F" is drawn for a scrubber using a "marble bed" as a filter element like the scrubber shown in U.S. Pat. No. 2,691,423.

In FIG. 7, the curve shows the difference in operating results between 8 stages of 3/16 inch rods with a 40 percent open area and 8 stages of screen mesh with a 46 percent open area. The screen mesh is less efficient probably because of cross-strands and increased friction and the screen requires additional support structure for carrying the same while the rods are self-supporting and lend structural strength to the scrubber housing 14. In both the rod stages and the screen stages, the liquor is supplied from outlets comprising straight pipe nipples rather than ceramic spray nozzles 56 and this reduces the efficiency somewhat because of poorer mixing. In the curve labeled "with water deflectors" plates are mounted some 3 to 5 inches below the outlet end of the nipples to deflect the discharge horizontally outwardly. This appeared to improve efficiency at the lower end. After the gases exit the uppermost scrubbing stage 50-8 in the scrubber housing 14 they flow upwardly into a final demisting section generally indicated by the reference numeral 62. The demisting section is separated and supported from the lower portion of the housing 14 by means of an upper, horizontal baffle 64 between the outlet bonnet 30 and the upper spray nozzles 56. The baffle 64 is provided with one or more elongated slots or openings therein to accommodate a row of vertically upstanding, demisting vanes 66, having a generally Z-shaped horizontal cross section. Each vane includes three planar sections arranged at an acute angle relative to the next adjacent section to rapidly change the gas flow direction. A flow of fresh makeup water is sprayed onto the lower segments of the demisting vanes via a plurality of spray nozzles 68 which are supplied from a manifold supply line 70 having a regulating control valve 72 therein for controlling the flow rate of makeup water to the system. Any liquid carried upward by the buoyant force of the gas flow is in the form of fine droplets or mist and the liquid mist impacts against and collects on the surfaces of the Z-shaped vanes 66. This liquid flows downwardly on the vane surfaces washing off the vanes and eventually moves downwardly into the main liquid flow in the scrubber housing. Reference should be had to U.S. Pat. No. 3,289,398 for a more complete description and operation of the demisting vane system 62.

It has been found that a controlled spray of fresh liquid from the nozzles 68 on the lower portions of the vane 66 keeps the vanes clean and free of material and the makeup water continually washes down the vanes without substantially increasing the moisture content of the gas leaving the scrubber bonnet 30. Fresh makeup water may also be added in the particulate stage 36 via the nozzles 38.

In accordance with the present invention and referring specifically to FIG. 2 the limestone slurry supply system 12 is adapted to provide a working supply of crushed limestone rock mixed with water in slurry form having a desired percentage of concentration. Slurry is supplied via the control valves 42 and 60 which in turn regulates the flow of the mixture into the respective manifolds 40 and 58. Liquid is supplied to the valve 60 from a pressure line 74 connected to the outlet side of a pressure pump 76 for pumping the slurry into the scrubber housing. The inlet side of the pump 76 is supplied with a slurry having a 15 percent concentration of solids consisting partly of crushed limestone and partly of fly ash in water via an inlet line 76 leading from a slurry holding tank 80. In the holding tank the crushed limestone rock in the slurry mixture is prevented from settling to the bottom of the tank by means of an agitator 82 driven by a motor 84 and shaft 86. New slurry is supplied to the holding tank 80 in the form of a mixture having a higher concentration of limestone therein via a supply line 88 connected to the outlet of a transfer pump 90. The inlet side of the transfer pump is supplied with a concentrated slurry mixture via an inlet line 92 connected to a slurry holding tank 94 which contains a quantity of slurry having a concentration of approximately 66 percent limestone rock in water. The tank 94 is also provided with a rotating agitator 96 driven by a shaft 98 and motor 100 to prevent the limestone from settling to the bottom of the tank.

In order to reduce the concentration of the 66 percent slurry delivered to the 15 percent slurry holding tank 80 via the line 88, the tank 80 is also supplied with reclaimed liquid from a settlement system (not shown). This liquid has a relatively low concentration of limestone and flows into the tank 80 via a supply line 102. The liquid supplied through the line 102 generally comprises a clear liquid which is obtained from the discharge material of the scrubber 10, after the material has been treated in a settlement system to remove the calcium sulphate, calcium sulphite and other contaminants therefrom which were collected in the scrubbing process in the scrubber 10. If desired, additional fresh makeup water can be supplied directly to the 15 percent holding tank 80 through a fresh water line 104 having a control valve 106 therein. The fresh water makeup supplied via the line 104 and the clear water returned to the line 102 are regulated and intermixed with the incoming high concentration slurry supplied via the line 88 from the tank 94 so that the concentration of limestone in the slurry held in the tank 80 is maintained at the desired concentration.

Reference should be had to the United States copending patent application Ser. No. 295,006 filed Oct. 4, 1972 and assigned to the same assignee as the present invention in which a slurry system like the system 12 is described in more detail. This copending application is incorporated herein by reference and it is sufficient to say herein that a portion of the material drained from the sump 26 from the scrubber housing 12 may be siphoned directly into the slurry tank 80 while another portion thereof is treated to remove the heavy sludge material therefrom in a settlement system (not shown). As described in the foregoing copending United States patent application limestone which is available in quantity at relatively low cost is supplied from railroad cars 108 or other conveyances to an unloading station 110 having elevating means 112 for delivering the material to a yard storage area 114. Preferably the material is broken or crushed to provide an average one inch particle size. Limestone from the storage area 114 is delivered in an elevator 116 into the feeder 118 of a ball mill crusher 120. Water is added to the ball mill through a line 122 and a control valve 124 in the line is adjustable to control the wetness of the limestone as it is crushed in the ball mill. Discharge from the ball mill 120 is directed into a holding tank 126 and additional water may be added via a supply line 128 with a control valve 130 therein. The holding tank 126 is continuously agitated by an agitator 132 and material is pumped therefrom via a line 134, pump 136 and pump outlet line 138 into a screen classifier 140 wherein oversized material is directed via a chute 142 back to the inlet side of the ball mill. The on-size material flows via a line 144 to the inlet side of a pump 146 which feeds the 66 percent slurry holding tank 94 via a line 148.

The foregoing slurry system 12 and scrubber 10 provide an exceptionally effective and economically sound system for removing sulphur dioxide from industrial gases and the like. The rod stages or zones employed by the multi-stage scrubber 10 are far superior to a packed tower system which is unuseable because of its tendency to rapidly plug up with precipitated out materials. The rods provide mechanical strength for the scrubber housing 14 and can be arranged to alternately run in transverse directions to provide additional mechanical strength.

In accordance with the invention a scrubbing liquid comprising a mixture of slaked line ($Ca(OH)_2$) and water is also useful in absorbing $SO_2$ from the gas being treated in the scrubbing zones 50-1, 2. . etc. of the scrubber 10. The slaked lime mixture is extremely reactive and efficient in absorbing $SO_2$, however, this advantage may be offset somewhat by the higher cost of slaked lime in comparison to crushed limestone. This higher cost may be offset, however, by the fact that because of the higher reactiveness of a slaked lime slurry with $SO_2$ in the gas, less contact time is required between the liquid and gas and hence a scrubber with fewer scrubbing zones 50-1, 2 etc. can be utilized at a consequent lower cost.

Another type of scrubbing liquid which can be used in the scrubber 10 comprises a mixture of Magnesium Hydroxide ($Mg_s(OH)_2$) and scrubbing liquids comprising mixtures of water and soluble alkalis such as Sodium Hydroxide (NaOH) and Ammonium Hydroxide ($NH_4OH$) are useful. These types of scrubbing liquid don't seem to have the problem of plugging up in the scrubber 10 of the present invention as they often do when used in conventional packed tower type scrubbers. The reaction products formed when the $SO_2$ is absorbed in these scrubbing liquids is somewhat soluble, however, suitable regeneration techniques are available to remove the reaction products from the scrubbing liquid so that the liquid may be reused. In many cases the reaction products so removed are economically valuable as fertilizers and process chemicals.

Although the present invention has been described with reference to a single illustrative embodiment thereof, it should be understood that numerous other modifications and embodiments can be devised by those skilled in the art that will fall within the spirit and scope of the principles of this invention.

What is claimed as new and desired to be secured by letters Patent of the United States is:

1. A wet scrubber for absorbing oxides of sulphur from contaminated gas comprising: an upright housing having an inlet for contaminated gas adjacent the lower end and an outlet for clean gas adjacent the upper end; a plurality of vertically stacked, intense wet scrubbing zones in said housing between said inlet and outlet, each zone comprising a transversely extending array of elongated, parallel, spaced apart, rod-like elements substantially reducing the total flow cross section for said gas flowing between adjacent elements below that of the flow cross section of said housing above and below said array; upper spray means adjacent an upper one of said scrubbing zones for distributing finely divided droplets of scrubbing liquor into said gas adjacent said elements to cascade downwardly countercurrent to said gas flow into successive lower scrubbing zones in said housing; and a high velocity particulate collector stage in said housing between said inlet and a lower one of said wet scrubbing zones comprising baffle means across said housing having a flow restricting opening therein and lower spray means for directing scrubbing liquid into the high velocity gas flowing through said opening in a concurrent direction therewith.

2. The wet scrubber of claim 1 wherein said particulate collector stage comprises a transversely extending baffle between said inlet and said lower one of said scrubbing zones, said baffle having at least one opening therein having a cross-section substantially less than that of said housing for causing accelerated upward gas flow therethrough and a plurality of elongated rod-like elements extending across said opening having impingement surfaces for receiving spray from said lower spray means for wetting and collecting particulant contaminants from said gas.

3. The scrubber of claim 1 including means for supporting said rod-like elements at opposite ends from walls of said housing permitting free rotation of said elements around their longitudinal axes.

4. The scrubber of claim 1 including a row of vanes between an upper one of said scrubbing zones and said outlet, each vane including at least a pair of vertically extending intersecting impingement surfaces in parallel spaced apart relation with surfaces of an adjacent vane in said row for collecting liquid from said gas flowing between said surfaces of said adjacent vanes.

5. The scrubber of claim 4 including means for washing down said vanes in said row with liquid to prevent accumulation of material on said surfaces thereof.

6. The scrubber of claim 1 in combination with a system for producing a slurry of crushed limestone and water for delivery to said upper spray means.

7. The wet scrubber of claim 2 including a collection sump adjacent the lower end of said housing below said inlet for collecting precipitous material formed by the mixing of said gas and said scrubbing liquid, and drain means for removing said collected materials from said housing.

* * * * *